Jan. 2, 1923.

L. F. CRUMLEY.
NUT HOLDING MEMBER.
FILED MAR. 23, 1922.

1,440,377

WITNESSES

INVENTOR
L. F. Crumley,
BY
ATTORNEYS

Patented Jan. 2, 1923.

1,440,377

UNITED STATES PATENT OFFICE.

LEONIDAS FRANKLIN CRUMLEY, OF LA FOLLETTE, TENNESSEE.

NUT-HOLDING MEMBER.

Application filed March 23, 1922. Serial No. 546,099.

*To all whom it may concern:*

Be it known that I, LEONIDAS FRANKLIN CRUMLEY, a citizen of the United States, and a resident of La Follette, in the county of Campbell and State of Tennessee, have invented certain new and useful Improvements in Nut-Holding Members, of which the following is a specification.

My present invention relates generally to nut holding members and more particularly to an implement for this purpose for use in connection with the band adjusting and manipulating rods located within a transmission case of a well known type of automobile, the friction bands of which on account of constant use require replacement from time to time, necessitating the removal of nuts from the threaded ends of the rods within the case and at points where the lack of space renders the usual nut removing operation so difficult as to frequently result in the dropping of the nuts into the transmission case when turned free of the rod by means of a wrench.

The object of my invention is to provide an implement by which the nut may be held from falling and withdrawn when free of the rod, and by which the nut when so held may be freely engaged and turned by a wrench.

Figure 1:
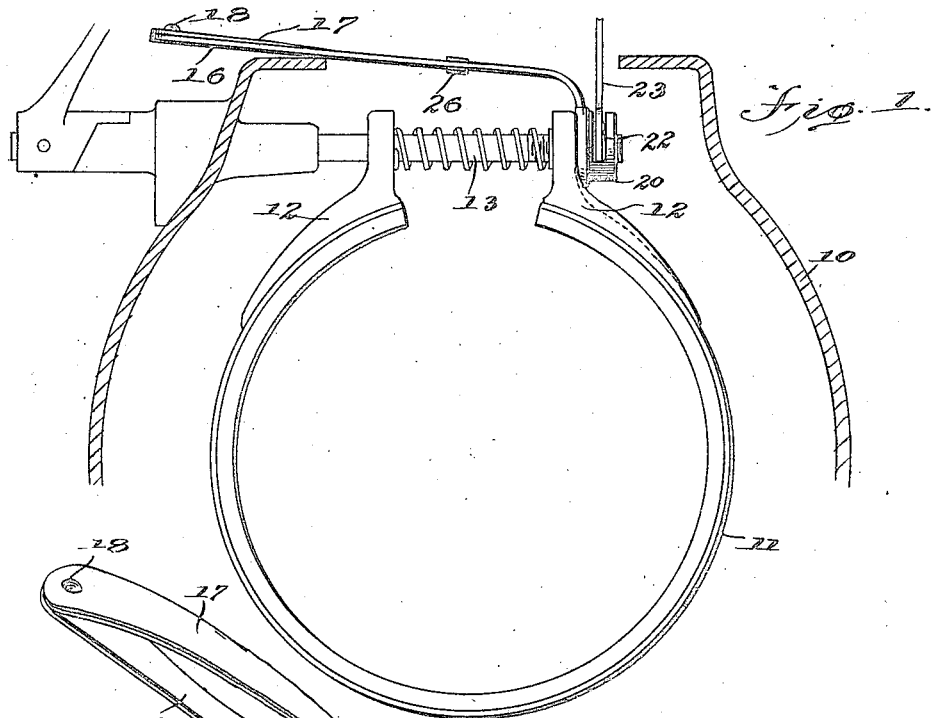
Figure 2:
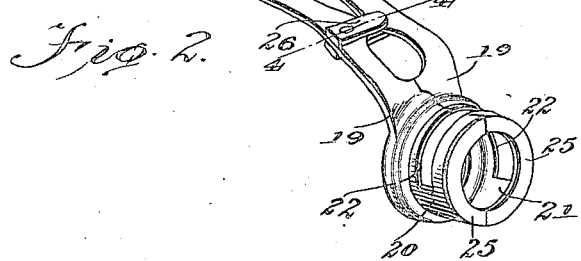
Figure 4:
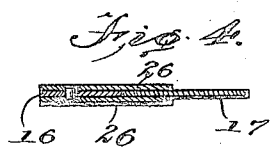
Figure 3:
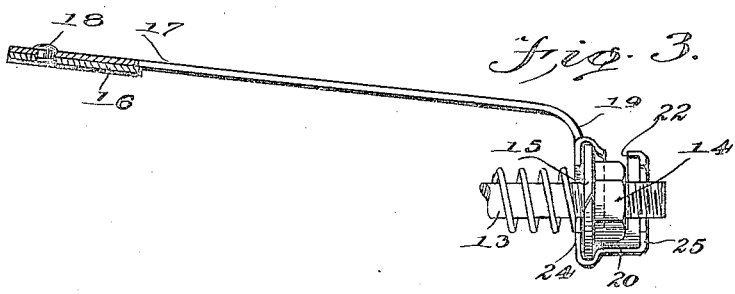

In the accompanying drawing illustrating my present invention and forming a part of this specification, Figure 1 is a sectional side view illustrating the practical application of my invention, Figure 2 is a detail perspective view of my improved nut holding implement, Figure 3 is a sectional side view illustrating one half of the implement in engaged position, and Figure 4 is a cross section taken on line 4—4 of Figure 2.

Referring now to these figures, I have shown in Figure 1 portions of the transmission case 10 as well as one of the friction bands 11 of a well known type of automobile, within the former of which the friction band is engaged by means of end lugs 12 with its controlling and adjusting rod 13 upon the inner end of the latter of which an adjusting and holding nut 14 is threaded, usually with a washer 15. Removal of the nut 14 precedes the usual operation of withdrawing the band 11 for renewal of the friction lining of the latter as required from time to time, and on account of the lack of space within the transmission case 10, it is usually very difficult to both unscrew the nut free from the rod and at the same time hold the nut to prevent it from falling within the transmission case when it is free of the rod.

My invention proposes an implement for the above purpose including a handle and a head, the handle comprising bars 16 and 17 pivotally connected at one end as at 18 and having angular extensions 19 at their opposite ends in connection with which the semicylindrical sections 20 and 21 of the head are formed, these sections being shiftable with the handle extensions into and out of edgewise abutting relation so that they may be moved upon opposite sides of the nut 14 and when engaged will form a cylindrical member loosely embracing the nut.

Each semicylindrical section is circumferentially slotted as at 22, the slot of each extending from one edge to a point adjacent the opposite edge so that the cylindrical nut embracing member formed by these sections thus provides for the reception and operative turning movements of a nut engaging wrench 23 as seen in Figure 1. The sections 20 and 21 of the cylindrical head are also provided with inturned flanges 24 and 25 at the inner and outer ends of the head so that it becomes quite obvious the nut 14 will be loosely confined when the implement is shifted into the effective position as shown in Figures 1 and 3 and may be thus held from dropping within the transmission case and easily removed from the latter when, by the use of the wrench 23, the nut 14 is turned free of the rod 13.

In order to hold the two sections against angular displacement, one of the handle bars, for instance the handle bar 16 as most plainly shown in Figures 2 and 4 is preferably provided upon its upper and lower surfaces with rigid outstanding ears 26 which in the operative position of the implement receive a portion of the bar 17 between the spaced projecting portions thereof and thus maintain the slots 22 of the sections of the head in properly alined relation.

I claim:

1. An implement of the type described including a pair of handle bars pivoted at one end and having angular extensions at their opposite ends, and a head of cylindrical form including semicylindrical sections each carried by the angular extension of one of said handle bars and shiftable with the latter laterally into and out of contact, said sections having slots extending from one edge to a point adjacent the opposite edge whereby to form an elongated circumferential slot in the head, and each of said sections having inturned flanges at its opposite ends.

2. An implement of the type described including a pair of handle bars pivoted at one end and having angular extensions at their opposite ends, and a head of cylindrical form including semicylindrical sections each carried by the angular extension of one of said handle bars and shiftable with the latter laterally into and out of contact, said sections having slots extending from one edge to a point adjacent the opposite edge whereby to form an elongated circumferential slot in the head, and each of said sections having inturned flanges at its opposite ends, and laterally projecting ears rigidly outstanding in spaced relation from one of said handle bars to receive therebetween a portion of the other handle bar in the effective position of the implement as and for the purpose described.

3. A nut-holding implement including a handle having pivoted extensions, and a head having coacting semicylindrical sections carried by said handle extensions, each section of said head being circumferentially slotted and having inturned end flanges as described.

4. A nut-holding implement including a handle and a sectional nut-embracing head adapted to loosely embrace a nut and having a slot adapted to receive a wrench and permit of manipulation of such wrench upon a nut embraced by the head.

5. A nut-holding implement including a handle and a nut enclosing head adapted to loosely surround a nut, said head having means to receive a wrench therein and permit of manipulation of such wrench upon a nut enclosed by the head.

LEONIDAS FRANKLIN CRUMLEY.